May 22, 1962 P. J. WEAVER 3,035,807
TRACER VALVE

Filed Aug. 1, 1960

INVENTOR.
PAUL J. WEAVER
BY
ATTORNEYS.

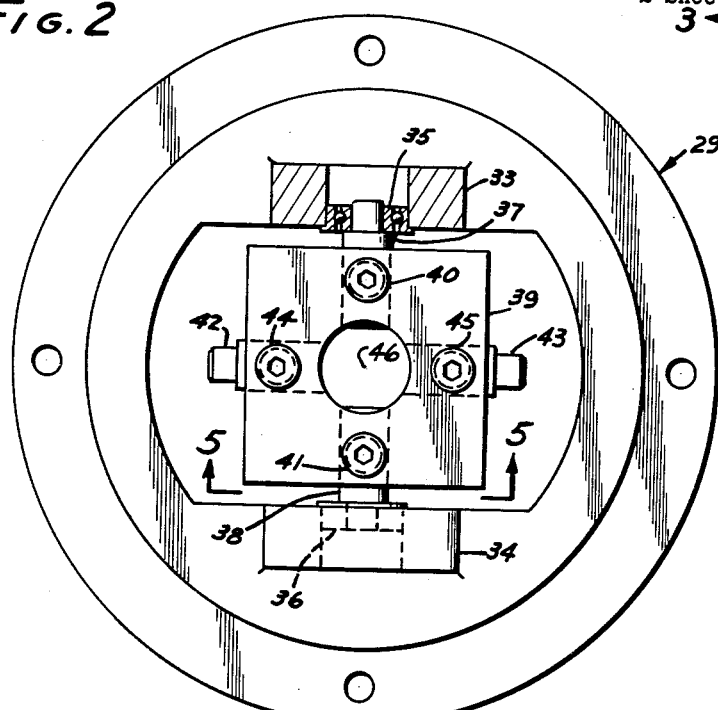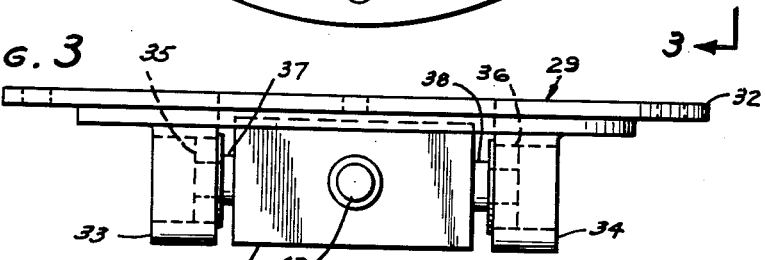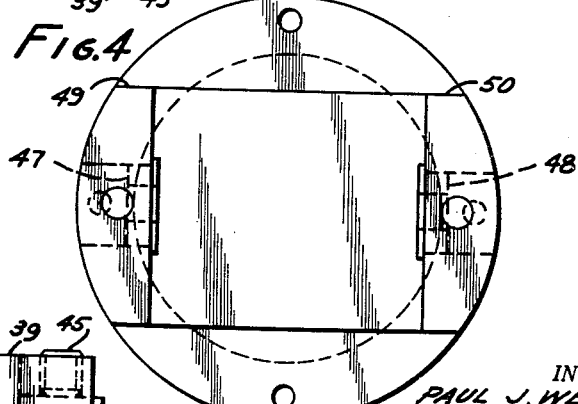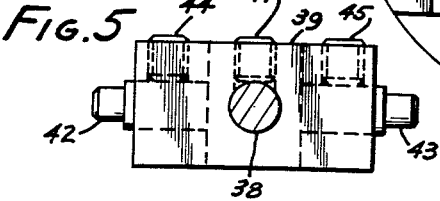

United States Patent Office 3,035,807
Patented May 22, 1962

3,035,807
TRACER VALVE
Paul J. Weaver, Downey, Calif., assignor to True-Trace Corporation, El Monte, Calif., a corporation of Connecticut
Filed Aug. 1, 1960, Ser. No. 46,778
2 Claims. (Cl. 251—3)

This invention relates to tracer valves of the type commonly used for controlling hydraulically-actuated tools, such as mills, lathes, and the like.

Tracer valves ordinarily include a spool-type valve constituted of a grooved spool within a grooved sleeve, the relative axial location of which establishes porting arrangements for controlling the flow of hydraulic fluid to shift relatively movable parts of machine tools relative to each other. The relative positioning of the spool and the sleeve is accomplished by contact between a pivotable stylus and a template or pattern. Pivoting of the stylus is converted into axial movement of the spool, and the porting arrangement effected by the pivoting movement causes the workpiece and cutter to travel a path through space identical to that traveled by the stylus and pattern. Such movement is part of a servo loop which tends always to eliminate the pivoted movement and return the stylus and valve to a neutral position. It will be seen that the stylus must be able to trace along a pattern or template and transmit its movement to the spool with fewest geometrical aberrations caused by its own structure, if accurate duplicating movements are to be attained.

One widely used conventional means for mounting such a stylus is shown in U.S. patent to Rosebrook, No. 2,753,145. In this construction, the valve body includes a ball seat, and the stylus includes a ball which universally mounts the stylus for tilting (pivotal) movement in any lateral direction relative to its own axis. Such constructions have been used for years, and have been quite successful. However, as needs for ever-improved surface finishes on work produced by contour duplicating machinery have arisen, attention has been directed to elements which have been regarded as standard, such as these ball mountings. It has been found that because the ball must be at least slightly loose so that it can move at all in its sockets, a certain amount of play and geometrical aberration arise, which limits the quality of the surface finish attainable.

Accordingly, it is an object of this invention to provide a means for mounting the stylus of a tracer valve in which there are no floating parts, such as ball and sockets. Instead, the locus of every part is definitely established. Furthermore, it is an object of this invention to provide a tracer mounting wherein friction is reduced to a negligible value, thereby lessening template and pattern pressures and increasing the tracer valve's sensitivity.

This invention is carried out in combination with a spool valve having a spool axially reciprocable within a sleeve. The sleeve is fitted into a body, or may itself constitute the body of the valve. A gimbal-type mounting is mounted to the body, and carries the stylus. The spool carries a member having a rim contactible by a portion of the gimbal mounting. The tilting of the stylus causes the gimbal mounting to tip, and contact said rim to axially shift the spool within the sleeve. The spool is biased against this movement. The spool shift thus adjusts the porting in response to the stylus tilt.

This invention will be fully understood from the following detailed description and the accompanying drawings, in which:

FIG. 2 is a top view of FIG. 1;

FIG. 3 is a side elevation of a portion of FIG. 2 taken at line 3—3 therein;

FIG. 4 is a bottom view of still another portion of FIG. 2; and

FIG. 5 is a side elevation, partly in cross-section, taken at line 5—5 of FIG. 2.

Figure 1:
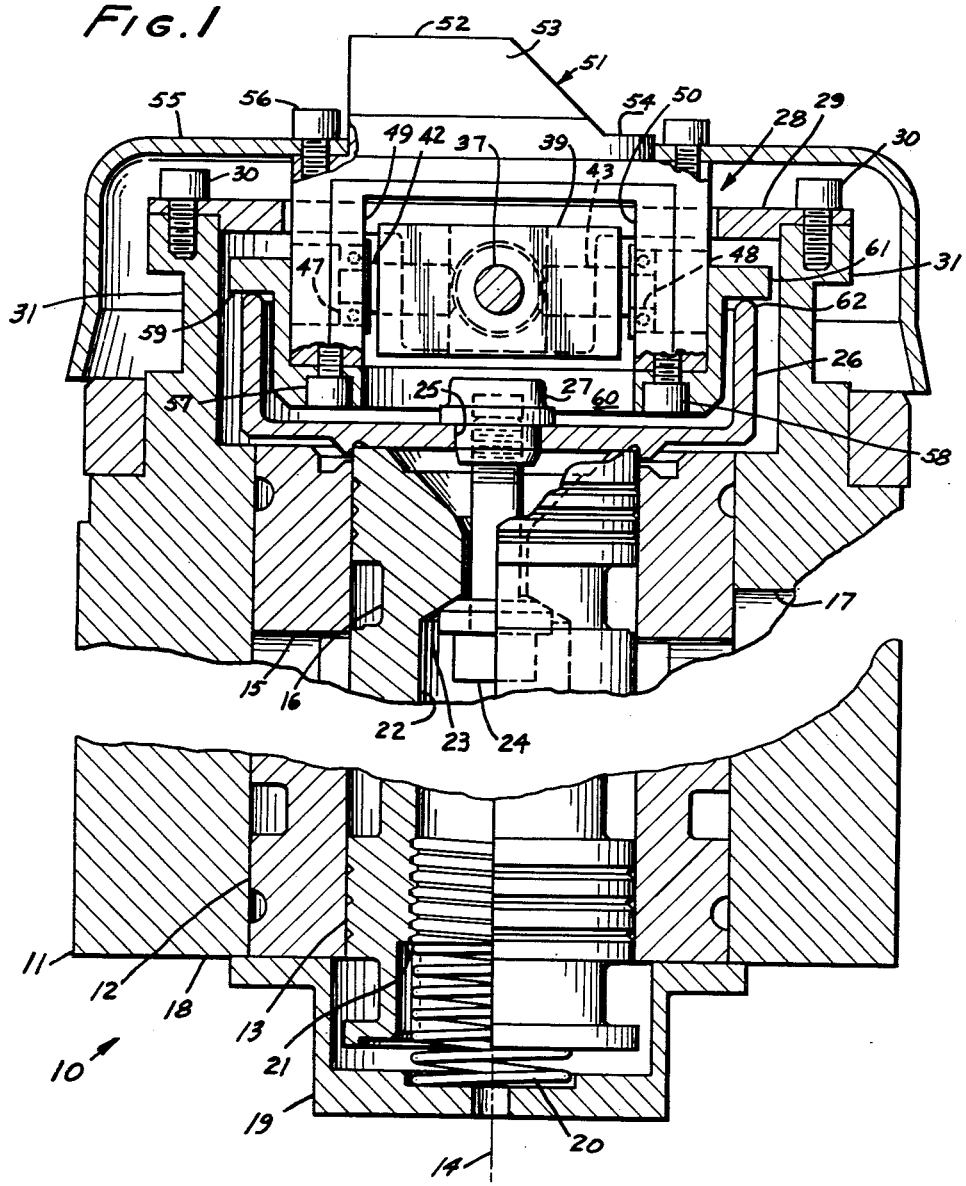
FIG. 1 is a side elevation, largely in cross-section, of the presently-preferred embodiment of the invention.

A tracer valve 10 according to the invention includes a body 11 having a sleeve 12 pressed therein. For all practical purposes the body and sleeve are integral, the two being made separately and then pressed together as a matter of manufacturing convenience. A spool 13 is slidably fitted in sleeve 12 where it is axially reciprocable along central axis 14. The sleeve and spool have grooves, of which grooves 15 and 16 are exemplary, which can be brought into registration to establish porting arrangements to shift parts of the machine tool. Ports, such as port 17 through the body, provide for connection of the grooves with motors that operate the machine tool. Because the hydraulic flow pattern through the spool valve forms no part of this invention, it is not described in detail here. Should more details of such a system, including the grooves on the spool and sleeve, be desired, reference may be had to said Rosebrook patent.

This valve is intended to stand in the position indicated but could be placed in any position. For convenience in disclosure, end 18 will be referred to as the bottom of the valve. To the bottom of the valve there is affixed a cap 19. The cap sustains and backs up a bias spring 20 which fits in seat 21 sunk in the bottom end of the spool to bias the spool upward.

The spool has a central bore 22 with an internal shoulder 23. A headed bolt 24 passes through the bore. Its head bears against shoulder 23. Its threaded end passes through an aperture 25 in a cup 26 to which it is held by a nut 27. The drawing together of the nut and the bolt head draws the cup firmly against spool 13 and thereby makes the cup an extension of the spool. It will now be seen that cup 26 is biased by spring 20 in an upward direction in FIG. 1.

A gimbal assembly 28 is mounted to the body by a support plate 29 held by screws 30 to legs 31 on the body. Support plate 29 is shown in FIG. 3. It has a flange 32 by which it is held down, and two downwardly depending bearing supports 33, 34 within which bearings 35, 36, respectively, are mounted. Bearing supports 33 and 34 are thus fixed in space relative to the body and sleeve, being supported through legs 31 and flange 32. Bearings 35 and 36 are axially aligned and receive the ends of shafts 37, 38, respectively. These shafts are held in bores in a gimbal block 39 by set screws 40, 41, respectively.

Another pair of shafts 42, 43 are similarly held in bores in the gimbal block by set screws 44, 45, respectively. The four shafts all lie in the same plane. Shafts 37 and 38 are coaxial, as are shafts 42 and 43. Their axes meet at point 46 which is the center of rotation of the gimbal assembly.

Shafts 42 and 43 have their other ends fixed in bearings 47, 48 in legs 49, 50, respectively, of a stylus member 51. This stylus member has an end mount 52 with a groove 53 or other provisions for receiving the actual point of the stylus, and a central structure 54 interconnecting this end mount and the legs 49, 50.

To the central structure, there is fixed a dust cover 55 by screws 56. The dust cover tilts with the stylus. The lower ends of legs 49, 50 are mounted by screws 57, 58 to fulcrum member 59. The fulcrum member has a central opening 60 to clear nut 27, and has a peripheral flange 61. The gimbal mount, which includes the stylus member, gimbal block, and support plate, together with the associated shafts, permits the fulcrum member to tilt in all directions around point 46. As one edge of flange 61 goes up, the other goes down, so that the effect on rim 62 of cup 26 of any tilting of the stylus is depression of the cup, and therefore of the spool in the sleeve.

The bearings can all be preloaded so that there is substantially no play in them, and the stylus member does not float; instead, it is fixed in space with respect to point 46 with the exception that it can tilt around that point. The normal central position of the device as shown in FIG. 1 calls for adjustment of the spool valve such that the stylus moves toward the template so that a light contact of the stylus with the template will cause a slight displacement of the spool valve to stop said movement, and further displacement would cause the spool to reverse the movement, thereby providing for bi-directional control along an axis by this particular device.

This invention thereby provides a stylus mounting for a tracer valve in which geometrical uncertainties caused by loose mounting of the stylus are entirely eliminated, and in which a substantially friction-free structure results.

This invention is not to be limited by the embodiment shown in the drawings and described in the description which is given by way of example and not of limitation, but only in accordance with the scope of the appended claims.

I claim:

1. In combination: a valve sleeve; a valve spool axially slidable within the valve sleeve; an apertured support plate mounted to the sleeve and carrying a pair of bearing supports axially aligned with each other across the aperture; a gimbal block having four shafts projecting therefrom in the same plane, members of each pair of shafts being axially aligned and normal to the members of the other pair, one pair of shafts being mounted to the bearing supports of the support plate; a fulcrum member mounted to the other pair of shafts, said fulcrum member being adapted to carry a stylus; a flange on the fulcrum member; and a cup mounted to the spool and having a rim lying in a single plane and adapted to bear against the flange.

2. Apparatus according to claim 1 in which the valve spool is biased to press the rim toward the flange.

References Cited in the file of this patent

UNITED STATES PATENTS 1,997,890    Wall ------------------ Apr. 16, 1935